United States Patent [19]
Cohn et al.

[11] Patent Number: 5,606,679
[45] Date of Patent: Feb. 25, 1997

[54] METHOD FOR OPTIMAL RETRIEVAL OF NON-VOLUME-SPECIFIC DATA

[75] Inventors: Oded Cohn, Haifa, Israel; William F. Micka, Tucson, Ariz.; Yosef Moatti, Haifa, Israel; Kenneth Nagin, Nazareth, Israel; Yoram Novick, Haifa, Israel; Efaim Zeidner, Kiryat Haim, Israel

[73] Assignee: International Business Machines Corporation, Armonk, N.Y.

[21] Appl. No.: 396,038

[22] Filed: Feb. 28, 1995

[51] Int. Cl.⁶ .............................. G06F 13/14; G06F 12/02
[52] U.S. Cl. .................... 395/404; 395/858; 395/403; 395/479; 395/438; 395/445; 395/857; 395/439; 364/DIG. 1
[58] Field of Search ................................ 395/600, 650, 395/438, 445, 479, 857, 858, 403, 404, 435, 439; 364/DIG. 1

[56] References Cited

U.S. PATENT DOCUMENTS

| | | | |
|---|---|---|---|
| 4,430,701 | 2/1984 | Christian et al. | 395/446 |
| 4,493,028 | 1/1985 | Heath | 395/821 |
| 4,819,159 | 4/1989 | Shipley et al. | 395/182.17 |
| 4,939,644 | 7/1990 | Harrington et al. | 395/825 |
| 5,161,227 | 11/1992 | Dias et al. | 395/650 |
| 5,218,695 | 6/1993 | Noveck et al. | 395/600 |
| 5,261,069 | 11/1993 | Wilkinson et al. | 395/472 |
| 5,287,459 | 2/1994 | Gniewek | 395/438 |
| 5,297,262 | 3/1994 | Cox et al. | 395/311 |
| 5,325,523 | 6/1994 | Beglin et al. | 395/600 |
| 5,341,491 | 8/1994 | Ramanujan | 395/479 |
| 5,408,656 | 4/1995 | Cohn et al. | 395/600 |
| 5,493,724 | 2/1996 | Cohn et al. | 395/858 |

OTHER PUBLICATIONS

IBM TDB —"Improving Airline Subsystem Performance by Overlapping Semi–Synchronous Process", Oct., 1991, vol.. 34, No. 5, pp. 345–347.

Enterprise Systems Architecture/390 —"System/360 & System/370 I/O Interface, Channel to Control Unit, Original Equipment Manufactures' Information", IBM GA22–6974–10, Sep., 1992.

*Primary Examiner*—Tod R. Swann
*Assistant Examiner*—James Peikari
*Attorney, Agent, or Firm*—F. E. Anderson

[57] ABSTRACT

A method and apparatus for improving storage controller throughput and reducing unit control block contention when selecting a Utility Volume for servicing non-specific read requests. Throughput is increased by enabling the storage controller to service non-specific read requests issued against a Utility Volume which is not the same as the device associated with the data that the non-specific read is requesting. The Utility Volume is dynamically selected by considering the current loads on the available devices for both specific and non-specific processing. A Penalty Index is assigned to each volume, wherein the Penalty Index is a weighted average of the specific and non-specific processing. The device having the lowest Penalty Index is selected as the Utility Volume for a session. A Penalty Index evaluation is made at a Reference Point which is further enabled by a random clock to ensure that sessions do not likely pick the same Utility Volume.

22 Claims, 5 Drawing Sheets

METHOD FOR OPTIMAL RETRIEVAL OF NON-VOLUME-SPECIFIC DATA

BACKGROUND OF THE INVENTION

1. Field of the Invention

The present invention relates in general to data management within computer storage subsystems and in particular to an improved method and system for selecting a non-busy device address when performing non-specific read requests.

2. Description of the Related Art

Data processing systems frequently include large scale storage devices, such as Direct Access Storage Devices (DASD) which are located externally to a host computer system and sometimes at significant distances from the host computer system. A storage controller is often installed between host processors and the DASD devices themselves. The storage controller acts not only as a path director for data flowing between the host computer and the DASDs but also as a performance enhancer for the data processing system as a whole. This second activity is accomplished through the use of cached memory within the storage controller.

The IBM 3990 Model 3, and Model 6 are examples of a storage controller having a cache function. This storage controller can attach to 370, 370-XA, ESA/370 and ESCON channels which are all well known in the art. When the storage controller is operating with 370 channels, it provides path-independent device allocation. When, on the other hand, the storage controller is operating with 370-XA, ESA/370 channels, it provides both path-independent device allocation and dynamic path reconnection.

Communication between the host computer and the storage controller is typically accomplished over data channels which are well known in the art. An example of such a data channel is the IBM Corporation's ESCON channel architecture. The data channels allow communication between the host computer and the storage controller using a set of commands which direct the controller to process specific data at specific locations. For example, in the IBM System/360 and System/370 host environments, the central processing unit (CPU) issues a series of commands identified in 360/370 architecture as Channel Command Words (CCWs) which control the operation of the associated DASD through the storage controller.

A common architecture used within storage subsystems is known as "Count-Key-Data" (CKD). With this architecture, records written on a track within a DASD unit are provided with a count field (size), an optional key field (identification) and a data field (record). A record on DASD may occupy one or more units of real storage. A dataset (also known as a data item) is a logical collection of multiple records which may be stored on contiguous units of real storage or which may be dispersed. Data is then stored and/or retrieved from a DASD using write and read requests which are issued by the host system.

Another channel program protocol, known as Extended Count Key Data (ECKD) was introduced to facilitate subsystem operation in an asynchronous manner. ECKD additionally provides an extended command set from that of CKD. ECKD includes all of the CKD commands, and enhanced versions of specific commands. Existent ECKD data retrieval protocols assume a host process data read request includes data descriptors. Data descriptors identify the location of a requested data record on DASD as well as the specific DASD (a device address which may also be referred to as a Utility Volume). Situations exist, however, wherein data is retrievable without data descriptors, for example, when retrieving data that is not associated with a particular device, for example, for data resident in cache or stored for concurrent or remote copy.

A data transfer operation is initiated by the host computer generating a START I/O instruction which is passed to the channel and causes control to be relinquished to a chain of CCWs. The CCW chain is then sent over the channel to the storage controller so that control operations can be effected and the proper storage device can be selected to activate data transfer.

Each CCW is separately resident in the CPU main store and must be fetched by the channel program, decoded and transferred to the storage controller. The CCW specifies the command to be executed and the storage area, if any, to be used.

The mechanism which enables host systems to retrieve data which has previously been stored on a disk is the "data disk address". Therefore, when issuing a read request, the host system specifies where on the DASD storage subsystem the data has been placed. Later, if the host system wishes to retrieve this data it will issue a read request utilizing the same address.

Data stored on a disk within a storage subsystem is always associated with a unique data descriptor which identifies that data. In a read request the host specifies the data descriptor of the data it wishes to receive. In response to such a request the DASD subsystem will send the referenced data back to the host. For purposes of the explanation herein, such read requests which utilize data descriptors are referred to as "specific read requests".

Over the past few years, cache, or high density electronic memory has been introduced into DASD storage subsystems. Access time between the cache and the channel is much faster than that between DASD and the channel. There are various physical device movements and other operations associated with DASD which limit data transmission speed. One such limitation is the time required for the magnetic disk to rotate until it is aligned with the transducer contained in the read head. Another is the limited bandwidth associated with the magnetic transducers used to read and write data.

These limitations are not present with a cache access. Through the use of various caching algorithms, frequently used data is maintained in cache storage rather than being read directly from DASD and, as a result, can be supplied to the channel at the speed associated with electronic storage rather than that of magnetic storage.

For read operations data can be transferred between the cache and channel at channel speeds which can often be as high as 18 MB per second, for example, depending upon the host processor, cache and channel configurations. In addition, it is also possible to accept and process write operations originating from the channel at greatly improved speeds through the use of cache.

In the ECKD architecture, the host refers to data stored on disk devices by data address. The data address is composed of a unique device address and the location of the data on the device. When a host issues a data request, read or write, it must select a device address first. This selection serves two different purposes. First, it is the mechanism by which the host informs the storage controller of the device portion of the data address. Secondly, it reserves the device for the request, blocking the execution of other requests against this device. This is done to prohibit attempts of multiple concurrent accesses to the physical disk device since the mechanics of the disk do not allow concurrent accesses to the media. Third, once a chain is issued, nothing should interfere with the chain, that is, the chain is an atomic operation.

The host processor maintains a Unit Control Block (UCB) lock for every DASD. When an I/O access is requested, the host first locks the host UCB entry associated with the device and then issues the request to the storage controller. During the period that the I/O request is being serviced, the UCB entry remains locked. If another request is made for data on the same device the request will be rejected or queued until the host UCB entry is freed.

The storage controller similarly maintains a UCB lock for every device. The storage controller UCB ensures serialization between multiple hosts, in the case where multiple hosts are connected to the storage controller. This storage controller UCB prevents multiple accesses to the same DASD by more than one host processor. When a device is selected in connection with a host data request, its UCB is reserved. Any other request attempting to select this device is rejected until the original request ends.

It is important to realize that in addition to allowing faster access to data, cache memory provides another key feature. As opposed to DASD units, cache permits multiple concurrent access to its data. In the absence of the invention described herein and as a result of the prior art data selection process, two data requests are still prohibited from concurrent execution if they refer to data on the same device even when the relevant data image is in the cache. This is because specific read requests, as described above, specify a disk address regardless of whether the data is in cache since the host is unaware of the true location of the requested data. Furthermore, two data requests specifying the same disk address are prevented from executing concurrently due to the limitations of the DASD devices.

When cache is present in a storage subsystem it is necessary to have two locks in addition to those described above. The first is a physical device lock. There is one such lock per DASD device and it is held when an access to the physical device is in progress. The lock may be held due to a host data request or a storage controller internal resource management operation. This lock, instead of the UCB lock in a non-cache environment, arbitrates attempts to gain multiple concurrent access to a particular physical device.

A second lock, termed a data lock, is also necessary in a cached subsystem. There is one such lock per "data item" contained within the cache memory and the lock is reserved when accessing the "data item" in the cache. Although the size of a "data item" can vary, for exemplary purposes it is noted that in the IBM 3990 Model 3, a "data item" corresponds to one track of data. Since cache, as described above, allows for multiple concurrent accesses to data, these locks are necessary to prevent multiple concurrent accesses to a specific item of data in the cache.

Those skilled in the art will appreciate that, in addition to providing cache access, it would be advantageous to permit a host system to retrieve data from a DASD subsystem on a basis other than a data descriptor. For example, in cases where the host system requests a large amount of data occupying many disk tracks the efficiency of transferring that data to the host might be enhanced if the order of data access and transfer is modified in order to minimize both seek time and latency time within the data storage subsystem.

This is generally not possible since host systems do not know the head location within the DASD subsystem and thus are not able to issue specific read requests which would minimize the disk seek and latency time. A method for permitting this type of data transfer using "non-specific reads" is described in a copending commonly-assigned U.S. Pat. No. 5,408,656 filed on Sep. 23, 1992 and titled "Method and System for Non-Specific Data Retrieval in a Data Processing System".

Non-Specific Data retrieval, as described in the above referenced patent application, is a method for increasing the efficiency of data retrieval from multiple DASDs by permitting the host system to retrieve data utilizing a non-specific read request. In other words, data may be requested by the host by specifying a non-address attribute. For example, in a case where large amounts of data need to be transferred and the order of transfer is not important, the storage subsystem can retrieve data which is physically closest to the head within the DASD device.

This is accomplished by specifying boundary addresses between which all data present is to be retrieved by the storage controller and transmitted to the host system. Thus, all data records between the boundary addresses are retrieved without specifying exact address data for each desired dataset. In addition to boundary addresses, data may be retrieved "non-specifically" by specifying as the non-address attribute those datasets which have been updated subsequent to a specified event.

Even with the advent of cache memory within storage controllers and the methodology of non-specific reads, storage controller throughput can be less than desirable. Currently, many disk device I/O protocols are implemented such that the number of I/O requests that may occur concurrently is limited by the number of physical devices that exist in a computer storage subsystem. This is because the majority of protocols, including IBM ECKD, associate each I/O operation with a device address. Furthermore, most storage controllers, including the IBM Model 3990, will only accept I/O operations directed toward a physical device to which it is attached and then only one operation per physical device at a time.

Given the above storage controller implementation limitations, the maximum number of concurrent I/O requests (which is equal to the number of physical DASDs) can not be overcome. In a typical data processing environment, however, all of the devices in the storage subsystem are rarely, if ever, accessed at the same time. Often specific DASD units are much more busy than other DASD units within the same storage subsystem. In fact, there are many devices that remain continuously idle and are used only as back up units in the event that another device fails.

Storage controller throughput is improved by using non-specific read requests, that is, the host computer specifies addresses of non-busy spare devices for accessing data stored on other busy devices to allow for concurrent data transfers between the host processor and a group of DASD devices through the storage controller. This is more fully described in copending, commonly-assigned U.S. Pat. No. 5,493,724, filed on Apr. 1, 1993 and titled "Utility Volume For Non-Specific Reads". While non-specific reads can enhance storage system throughput, the inventors of the present invention have discovered that if certain device addresses are used extensively as utility volumes, then queuing still occurs, thus not only reducing performance gains but possibly reducing even the base performance. Hence, good utility volume selection must take into account load dynamics in the data processing system. Heretobefore, a method for dynamic utility volume selection for improving non-busy device selection has not been known.

Thus, what is needed is dynamic selection mechanism for selecting a non-busy utility volume when servicing a non-specific read request, by considering load balancing dynamics.

SUMMARY OF THE INVENTION

An object of the present invention is to provide an improved non-specific read request method for efficiently managing a data storage subsystem in a data processing system.

Another object of the present invention is to increase the operating speed of the storage subsystem.

Yet another object of the present invention is to optimize retrieval of non-volume-specific data, in part, by dynamically selecting non-busy utility volumes.

According to a preferred embodiment of the present invention, a data processing system includes at least one host system, a storage controller attached to the host system, and a plurality of data storage devices connected to the storage controller. The host system maintains a host unit control block for each data storage device of the plurality of data storage devices and the storage controller maintains a controller unit control block for each of the data storage devices, at least one data storage device being selected as a current Utility Volume. In the data processing system a method for selecting a new Utility Volume for servicing a session generating a non-specific read request for a data record from the host system comprises interrogating that session, wherein the data record resides on a first data storage device of the plurality of data storage devices. A first host control block corresponds with the non-specific read request. Based upon the interrogation, the storage controller determines whether a selection must be made for selecting the new Utility Volume. If a new Utility Volume selection is required, new Utility Volume is selected from the plurality of data storage devices based upon weighted load conditions of each of the plurality of data storage devices. The new Utility Volume is that volume having a lowest weighted load condition, wherein a second host unit control block is associated therewith, and wherein the second host unit control block corresponds to a second data storage device of the plurality of data storage devices. The second host unit control block is then locked. Next the non-specific read request is transmitted to the storage controller, the non-specific read request including the second host unit control block.

BRIEF DESCRIPTION OF THE DRAWING

The above and further objects, features and advantages of the present invention will become more apparent from the following detailed description taken in conjunction with the accompanying drawing, wherein.

DETAILED DESCRIPTION OF THE INVENTION

Figure 1:
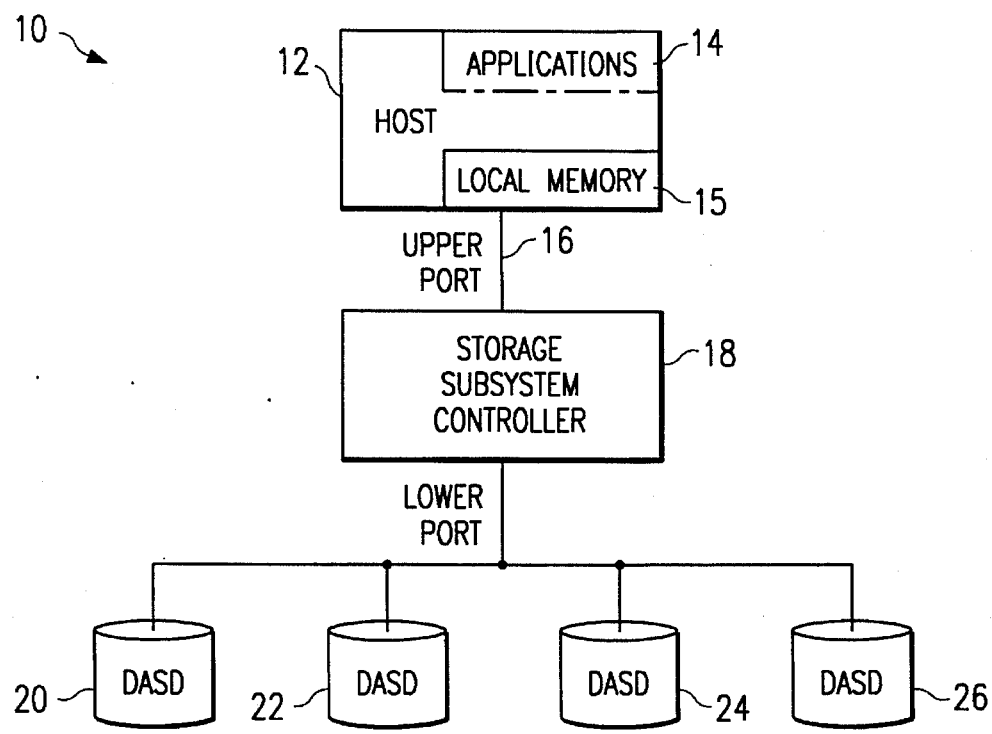
FIG. 1 is a pictorial representation of a data processing system which may be used to implement the method and apparatus of the present invention.

Referring now to FIG. 1, a data processing system 10 in which the present invention is embodied will be described. Data processing system 10 includes a storage controller 18, a host processor 12 and a plurality of direct access storage devices (DASD's) 20, 22, 24 and 26. Although only one host processor is pictured, it should be recognized that additional host processors can be connected to a single storage controller in order to share DASD devices. DASDs are generally magnetic storage units such as disk drives. In this embodiment, the DASDs 20–26 are connected to the storage controller 18 for further connection to the host processor 12. The storage controller 18 is preferably an IBM 3990 Model 3 or Model 6. Host processor 12 is typically a main frame system such as the IBM 3090, ES9000 Model computer, or a comparable system.

The host processor 12 is connected, for example, to storage controller 18 through either 4, 8, 12, or 16 system adapters ((SA) not shown). There are many types of system adapters: including parallel and ESCON, although the invention is not limited to these channel types. Parallel system adapters provide attachment to channels via a parallel I/O interface. ESCON system adapters provide serial channel attachment via the ESCON I/O interface. Each parallel system adapter attaches to one host channel or channel emulator while an ESCON system adapter can attach to multiple host channels.

Each system adapter, in turn, contains a number of control structures which results in the ability to provide up to 128 channels in communication with the storage controller 18 when using ESCON SAs. While it is necessary to understand, generally, that channels connect to the storage controller 18, a discussion of the various channel configurations is not necessary for an understanding of the present invention.

Applications 14 within the host 12 may be utilized to access and manipulate data stored within the storage subsystem in a manner well known in the art. Access to desired datasets within the storage subsystem is typically accomplished in the prior art, by setting forth and specifying a unique address or data descriptor for the desired data and transmitting that data descriptor to storage controller 18 via data channel 16.

Read operations in a caching subsystem are now described. When a read request from the host 12 occurs, it is first determined whether the requested data is currently located within the cache 58 (see FIG. 2). If it is, the selected data is transferred directly from the cache 58, through the data channel 16 to the host 12. This situation is known as a "read hit". If the data requested by the channel is not present in the cache 58, a "read miss" occurs and the data must be retrieved from the DASD device. When this happens, the data is typically concurrently written to cache 58 in anticipation of future requests for that data. In addition, the data present from the requested record to the end of the DASD track is typically copied into cache 58.

Figure 2:
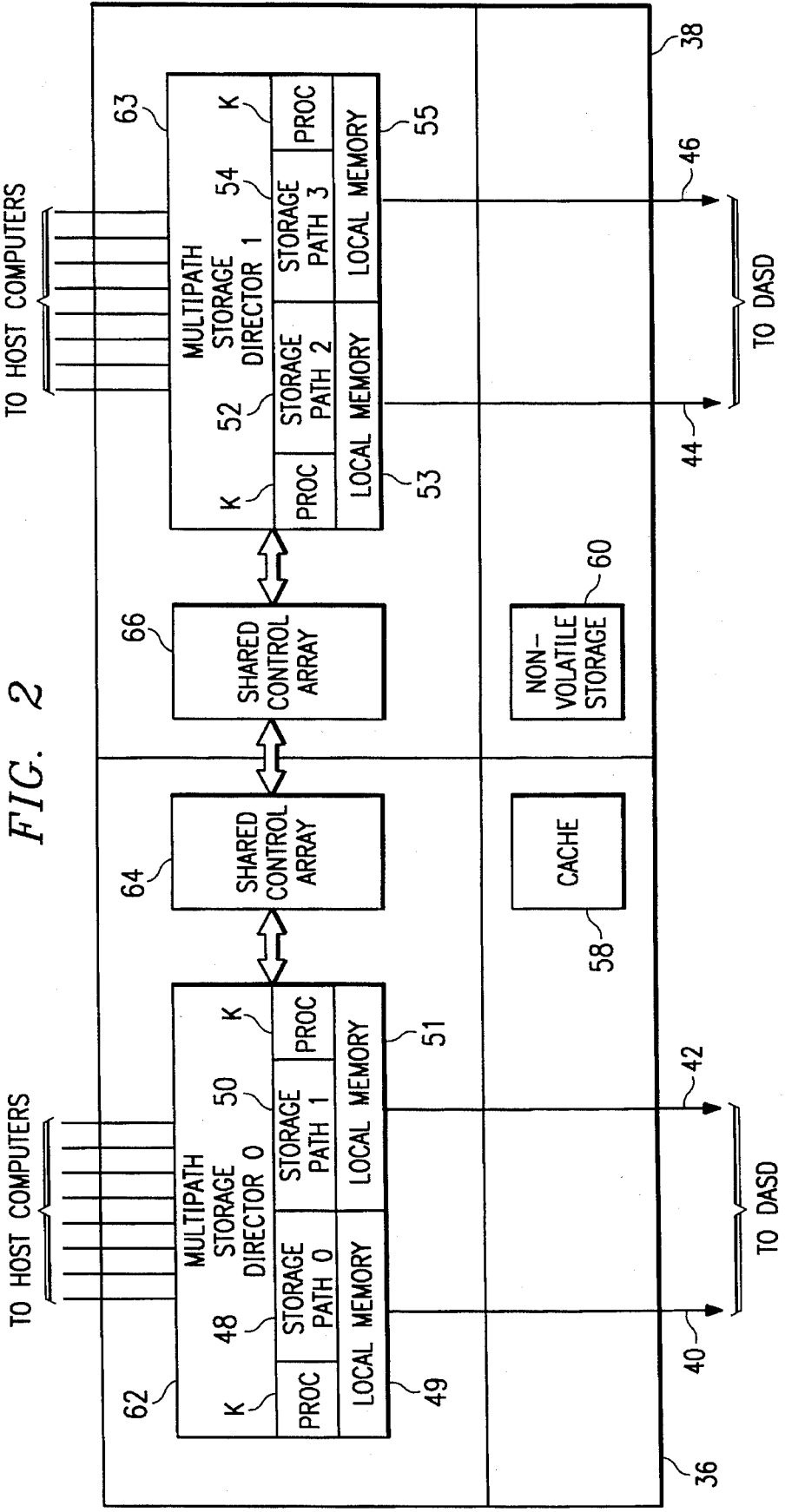
FIG. 2 is a block diagram of a storage controller in the data processing system of the present invention.

Turning to the description of the components in the storage controller 18 depicted in FIG. 2, it can be seen that each cage 36 and 38 is configured with two Storage Paths (SPs) 48, 50, 52 and 54. Each storage path contains a microprocessor capable of interpreting channel commands from the host 12 and controlling the attached DASDs.

Further, each cage contains Shared Control Array (SCA) storage 64 and 66. The SCA stores local status information as well as status information shared with the SCA located in the other cage within the storage controller 18. In this way, unless there is a failure condition present in one or both of the cages, the contents of the two SCAs is identical. Typical shared data includes device status and reconnection data as well as a variety of external registers used by the microprocessors contained in each of the storage paths 48, 50, 52, and 54. SCA data is accessible to all four storage paths 48, 50, 52, and 54.

Figure 3:
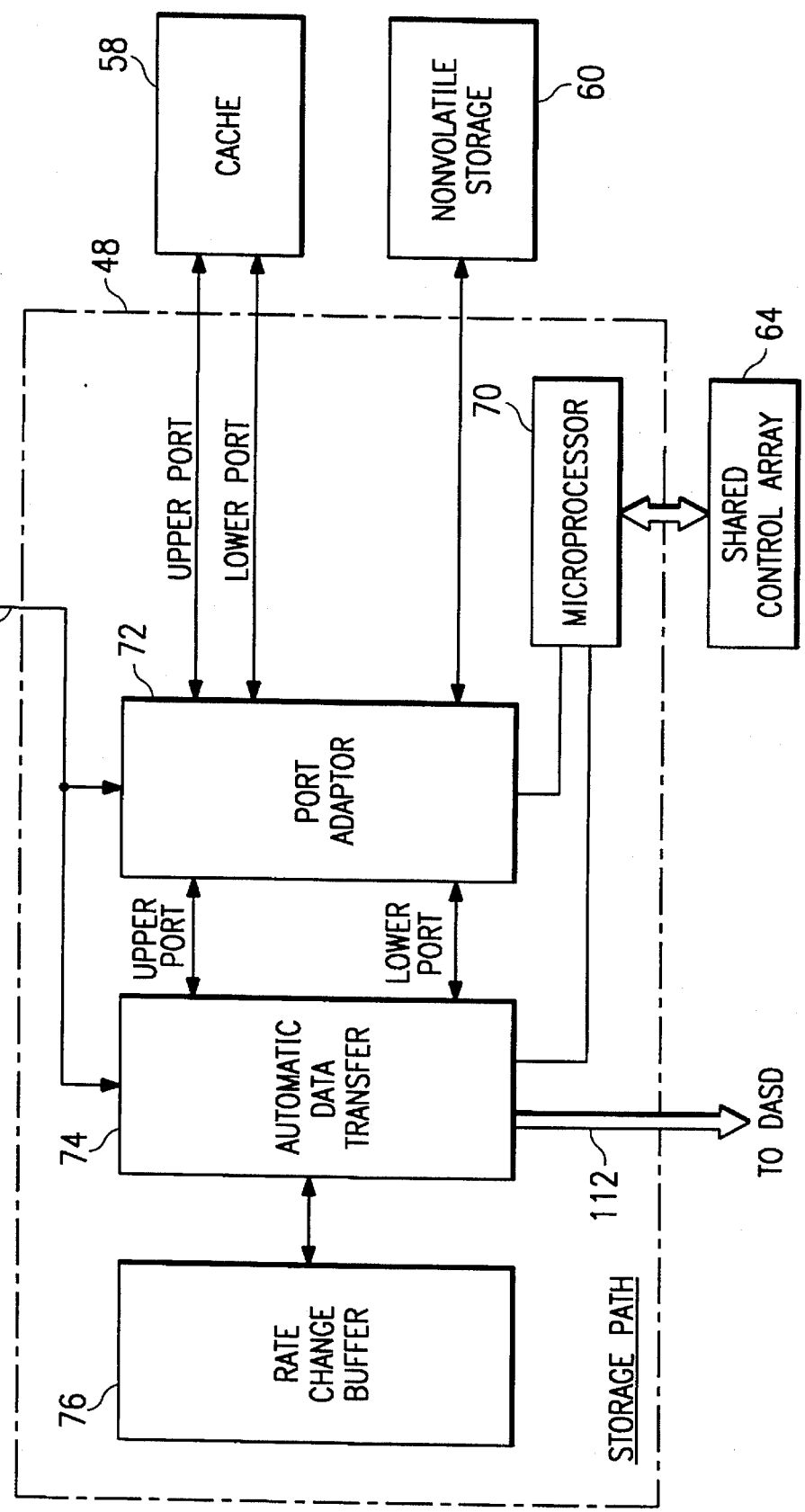
FIG. 3 is a block diagram of a storage path processor contained within the storage controller of the present invention.

FIG. 3 shows one of the four storage paths 48 in the storage controller 18 in a block diagram schematic. All four storage paths being identical, only one will be described herein. Storage path 48 is connected to 8×2 switch 62 by an upper port 110 and to a plurality of DASDs by a lower port 112. Data transfer between the multipath storage director 62 and one of the DASDs during direct DASD operations occurs via an automatic data transfer circuit (ADT) 74 supported by a rate change buffer 76, if required. Rate change buffer 76 compensates for differences between the speed of data transference by DASD and that of channel to host communications. Channel transfers typically occur at a much higher rate than DASD to controller transfers.

The storage path 48 also contains a microprocessor 70 which functions to control all operations taking place on the storage path 48. The microprocessor 70 executes microinstructions which are loaded into a control store (not shown) through an external support facility.

A port adapter (PA) 72 provides control and data paths for the transfer of data between cache 58, nonvolatile storage 60, microprocessor 70 and upper and lower ports 110 and 112.

Cache 58 contains two ports (upper and lower) to allow for two simultaneous data transfers to and/or from the cache element 58. By way of example, data may be transferred from cache 58 and the channel while also transferring data to cache 58 from DASD. Data transfer is typically set up by microcontroller 70 and then taken over by the automatic data transfer 74 function without microcontroller intervention until transfer termination.

The storage subsystem 18, services both specific and non-specific data operations. A specific data operation or request, for example, involves writing or updating data to the storage devices wherein a specific device address is issued (as required in the ECKD protocol). A non-specific data request, on the other hand, could involve a remote copy session wherein blocks of data are read from the storage devices to be copied at a secondary or remote location. In this instance, specific device addresses are not required from the host (except to comply with ECKD protocol). Hence, in a caching storage controller, non-specific read requests may choose any device in their selection process. The device need not be the one which actually contains the data. The above mentioned device selection process is not required with non-specific read requests since for non-specific reads the storage controller 18 implicitly determines the data address as well as the device address based on the data supplied by the host 12 with regard to the non-specific read request.

In addition, the device selection process with non-specific reads is not needed to lock the physical device since for a cached storage controller, multiple concurrent access to data of a particular device is allowed. The storage controller 18 prevents concurrent access to the same physical device by internally obtaining the corresponding physical device lock. The storage controller 18 also prevents concurrent access to a particular data image in cache 58 by locking the corresponding cache data lock.

For ease of understanding the invention herein, non-specific reads is first described wherein one particular DASD or a set of DASDs is designated to be selected for all non-specific read requests. This device or set of devices is termed the Utility Volume(s). It is preferable to designate as the Utility Volume the least busy DASD device attached to the storage controller 18. This guarantees that the non-specific read request will rarely, if ever, be rejected on account of a device being busy. This also reduces the probability that the non-specific read request will interfere with another I/O operation.

It is also possible to designate dummy devices as Utility Volumes. A dummy device is a device whose address is recognized by the storage controller 18 for selection purposes even though there is no real physical device associated with this address. A dummy device is a very good candidate for a Utility Volume since, on one hand it is never busy unless servicing a non-specific read request, while on the other hand, the non-specific read requests will not interfere with the execution of regular data requests for real (non-dummy) devices.

Figure 4:
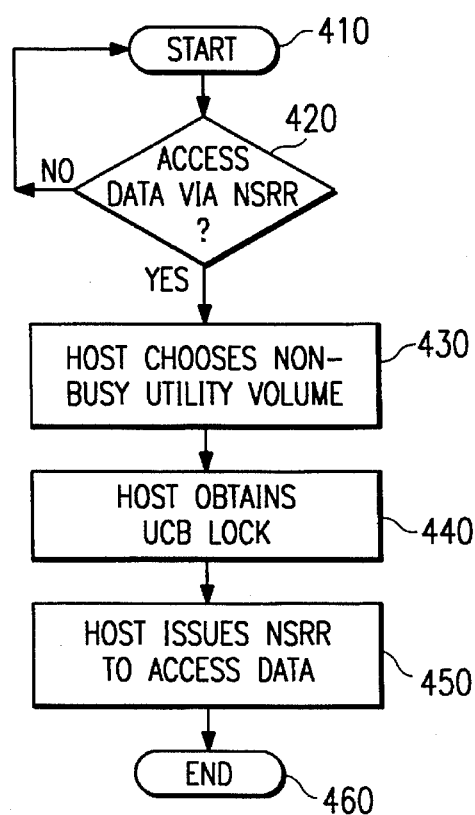
FIG. 4 is a high level logic flowchart illustrating the process by which a host processor services an I/O request.
Figure 5:
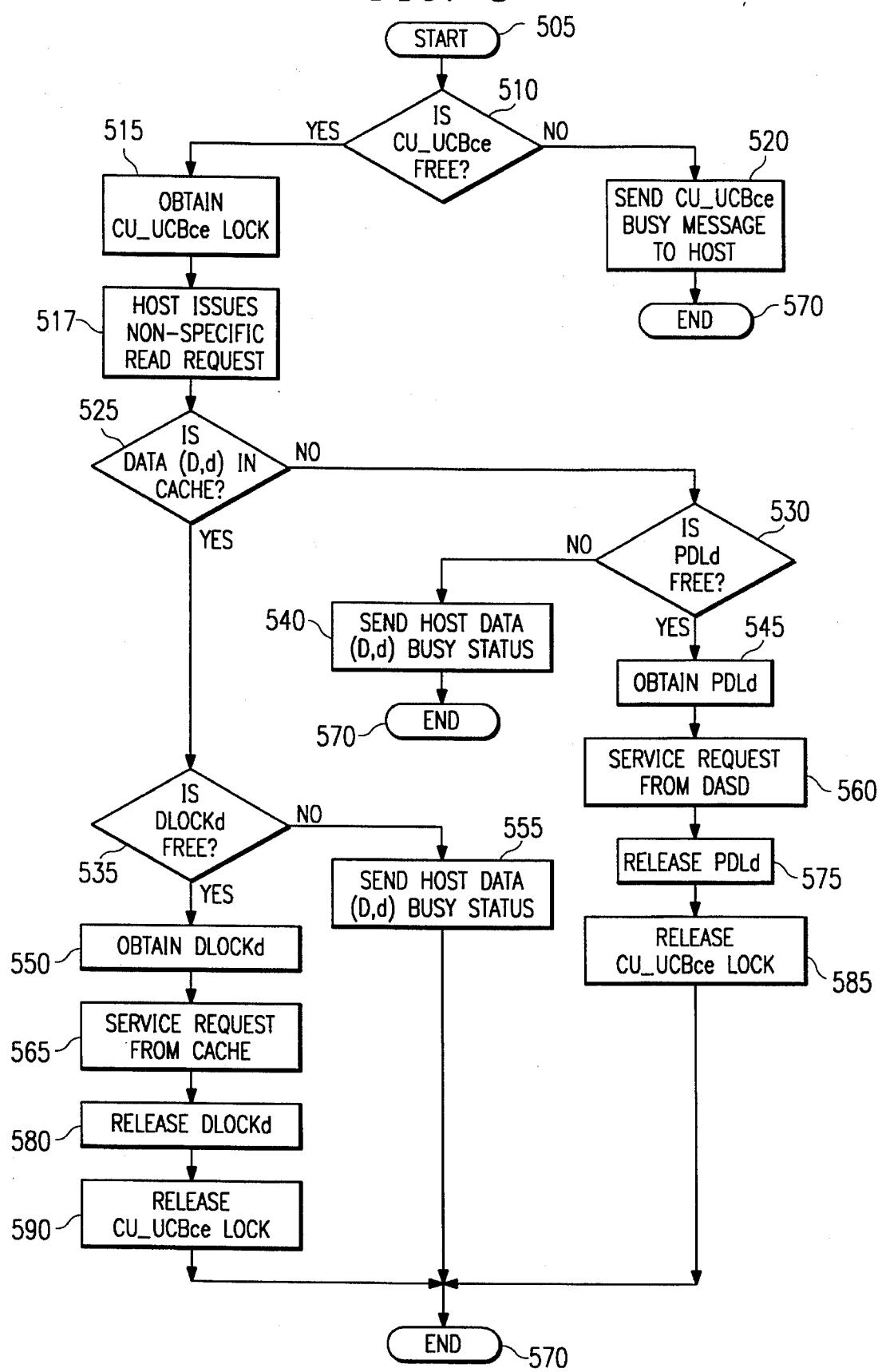
FIG. 5 is a high level logic flowchart illustrating the process by which the storage controller services an I/O request originating from a connected host processor.

The method used to obtain the advantages of servicing non-specific read requests on Utility Volumes is now described in detail and with reference to FIGS. 4 and 5. The following discussion requires, as a preliminary matter, some definitions:

Let Host_$UCB_{CD}$ be the host processor's unique control block for device D controlled by storage controller 18.

Let CU_$UCB_{CD}$ be the storage controller 18's unit control block for device D.

Let $PDL_D$ be the physical device lock for device D.

Let $DLOCK_d$ be the data lock for data item d.

Let DATA(D,d) be the data item to be read by the non-specific read request from location d of device D.

Referring first to FIG. 4, the processing, at the host 12, of a read request for DATA(D,d) is first described. The process begins at step 410. At step 420, it is determined whether the host 12 is requesting data using a non-specific read request. If not, processing continues in a normal fashion (i.e. data is requested using a device address) as is known in the prior art. If the read request is a non-specific read request, then processing continues at step 430. At this step, the host 12 chooses a logically non-busy Utility Volume Host_$UCB_{CE}$ from its set of Host_UCBs that are associated with storage controller 18. For purposes of discussion, this device will be denoted device E. It can be a dummy device or a real device depending on the system configuration.

At step 440, the host 12 obtains a lock for Host_$UCB_{CE}$ in the UCB contained within the requesting host 12. This prevents the requesting host 12 from attempting another I/O operation with the selected device E. It is important to note here, as well as throughout the following discussion, that the two step process of first interrogating a lock and second obtaining the lock, if the lock is free, must be treated and executed as a single atomic operation. It will be clear to one skilled in the art why this is so. Finally, at step 450, the host 12 issues a non-specific read request against Host_$UCB_{CE}$ in order to access Data(D,d). Again, it is important to note that although the data being requested, Data(D,d) is physically located on device D (or in cache 58) the data is requested as if it were located on the Utility Volume, device E.

Turning to FIG. 5, it will now be described how the non-specific read request initiated at the host 12 is serviced at the storage controller 18. The process is initiated at step 505. Following that, at step 510, the storage controller 18 determines if device E is free based upon its own unit control block. If CU_UCB$_{CE}$ is busy then processing continues at step 520. At this step, the storage controller 18 sends a message to the host 12, via the channel, that CU_UCB$_{CE}$ is busy. At this point, processing ends at step 570 and the host 12 must wait for the device to free before it can accomplish the requested non-specific read.

If, on the other hand, CU_UCB$_{CE}$ is free then the storage controller 18 immediately obtains a lock for CU_UCB$_{CE}$ at step 515. The host then requests data via a non-specific read at step 517. Next, at step 525, the storage controller 18 determines whether Data(D,d), which was requested by the host 12, is located within the storage controller cache 58. The following discussion will describe operations if Data(D,d) is in the cache 58. After this discussion, a description of processing in the case where data is not located in the cache 58 will follow. It is important to note that the following descriptions assume that a non-specific read request may be serviced by a DASD physical device. There are instances where an implementation requires that all read requests be serviced only through the cache 58.

When data is found in the storage controller cache 58, it is determined, at step 535, whether the data lock for data item d is free. As described above, in the preferred embodiment of this invention, the storage controller 18 is an IBM 3990 Model 3 or Model 6 which defines a data item located in the cache 58 as one or more modified records within a track. If the data lock is busy, the storage controller 18, at step 555 sends the host 12 a message indicating that Data(D, d) is busy. The host 12 can retry later, but until the data lock is released, the host 12 can not access the data irrespective of the fact that the same data may be located on a physical device as well. Processing then terminates at step 570.

If, however, the data lock is free, processing continues at step 550. At this step DLOCK$_d$ is obtained by the storage controller 18. Next, at step 565, the read request is serviced from the cache 58 in a manner the same as with any other read hit. Once the data transfer to the host 12 is completed, DLOCK$_d$ is released in order to allow other I/O operations with the cache data track. Finally at step 590, the CU_UCB$_{CE}$ lock is released to permit future access to the Utility Volume. Processing then terminates at step 570.

Returning to the decision at step 525, if Data(D,d) is not located in cache 58, the processing flow follows a second path which will now be described. When the data item requested is not located in the cache memory 58 it must be retrieved from the physical DASD device. At step 530, the physical device lock for device D (PLD$_d$) must be interrogated to determine if the data can be read from the device on which it resides. If the device is locked (PDL$_d$ is set) then processing continues at step 540. At this step, the storage controller 18 sends the host 12 a message that Data(D,d) is busy and the host 12 must then wait until the physical device is released before it can read Data(D,d). Processing terminates at step 570.

In the case where PDL$_d$ is free (the DASD may be accessed) processing branches to step 545. At this step the storage controller 18 obtains PDL$_d$ to prevent simultaneous access to this DASD by another entity. Next, at step 560, the read request is serviced from the DASD device and data is sent over the channel to the host processor 12. At step 575, PLD$_d$ is released and at step 585 the CU_UCB$_{CE}$ lock is released. Processing then terminates at step 570.

The execution of a non-specific read request may sometimes be postponed, for example, when the necessary locks are not free, instead of aborting the operation entirely. This can be accomplished by using a delayed retry status instead of simply rejecting the request with a busy status.

The invention herein provides among its advantages the ability to concurrently process data transfer operations. For example, when a non-specific read request is being serviced through the cache, other (specific or non-specific) data requests may be executed in parallel even though both transfer operations are accessing the same physical device or data image of the same physical device. As another example, when a non-specific read request is being serviced from a DASD device, other data requests accessing the cache data image of the same physical device as the device accessed by the non-specific read request may be processed in parallel.

In a preferred embodiment of the present invention, further improvements in data processing are realized by dynamically selecting a non-busy Utility Volume. Using a given device address extensively as a Utility Volume causes queuing effects, thus adversely affecting otherwise potential performance gains. Referring back to FIG. 4, at step 430, the Utility Volume selection is improved by considering actual specific and non-specific device usage and dynamically making selections accordingly. Improved Utility Volume selection for non-specific reads reduces interference with specific I/Os as well as reduces interference amongst other non-specific reads.

Dynamic Utility Volume selection is desirable since selecting a non-busy device, though originally non-busy, can later become busy. Also, selecting the same non-busy device in many sessions can result in the non-busy device becoming overloaded. Hence, non-busy is a dynamic property. Conversely, an active device may later become idle or non-busy and thus become a good candidate for a Utility Volume. In order to select the best Utility Volume, a selection mechanism preferably continuously monitors storage subsystem load and reacts promptly. Such monitoring is not practical at the host level since several host processors are typically connected to a single storage controller, and each host processor embodies only that information related to its own activities. If non-specific DASD activity is substantial, there may be an insufficient number of non-busy Utility Volumes, in which case other devices with low device specific loads may be alternately chosen as Utility Volumes. In this scenario, the overall load of specific I/Os and non-specific read requests must be balanced amongst the devices. While monitoring activities on devices, a session would preferably subtract its own activity in order to accurately evaluate the consequences of a Utility Volume selection.

A data structure according to the preferred embodiment of the present invention resides partly in local memory 15 (FIG. 1) in host processor 12 (and in each additional connected host processor) and partly in shared control memory 64, 66 (FIG. 2). Such data structure includes auxiliary counters and indexes of device specific and non-specific activity (also known as load indexes). Broadly stated, the load indexes are generally proportional to a weighted average number of I/Os per second of each type (specific and non-specific). The weight of each I/O is not linear, rather the weight of each I/O exponentially decreases with time (the time between the moment the last index was calculated and the time the I/O was registered). Therefore, only the most recent I/Os substantially impact the load indexes, and as time goes by their impact gives way to the impact of newcomers. Load dynamics are thus reflected in the load stream of a certain type at the devices while only using a single data field.

Because access time to shared memory is often longer than the access time to local memory units, the storage controller handles the counters locally and keeps a separate local image of the load indexes. From time to time, at refresh points, the indexes are calculated at the storage controller and updated at both the shared memory and local memory. Thus a tradeoff is made between the currency of the load indexes and the maintenance time.

Figure 6:
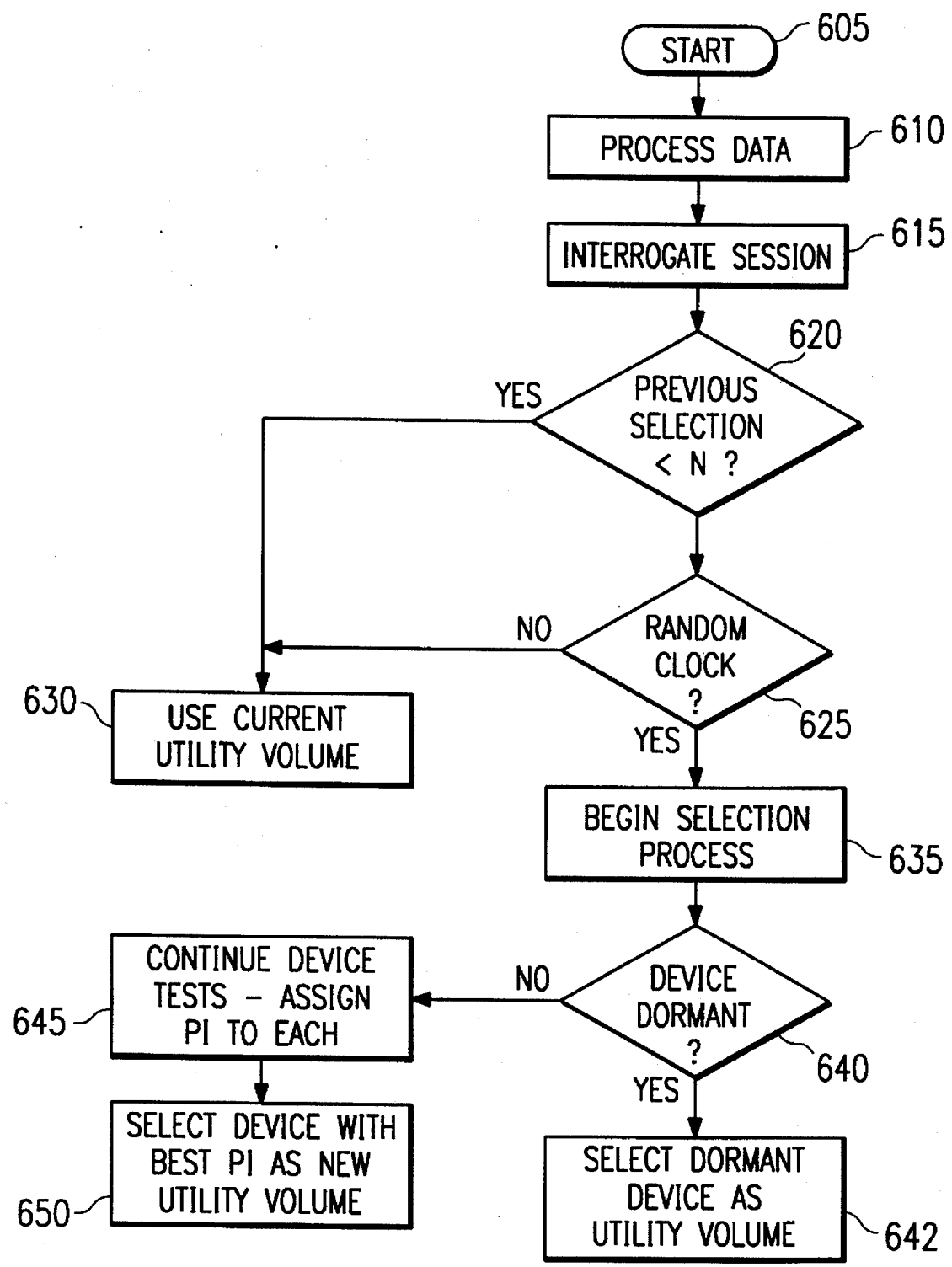
FIG. 6 is a flowchart diagramming a process for selecting a utility volume for a non-specific read according to a preferred embodiment of the present invention.

FIG. 6 is a high level flow chart diagramming the Utility Volume selection process embodied in step 430 (FIG. 1). The Utility Volume selection process starts at step 605 and at step 610 the storage controller 18 is processing data, that is, specific data requests by the host processors are being processed by the storage controller. A session is interrogated at step 615, that is, non-specific DASD read requests are made, for example, as a result of a remote copy session. Each session indicates a device to be used as a Utility Volume. The session might initially use a same Utility volume that was used on a previous request, or may try to pick a new Utility Volume. Preferably, those devices not having specific activity (dormant devices) are chosen as Utility Volumes as often as possible while avoiding overloading such devices with non-specific activity. In the event that dormant devices do become overloaded, then those devices having relatively low device specific activity are used as Utility Volumes.

A test for whether to perform a new selection process is made at step 620. This procedure is not run for each non-specific read request, rather the procedure is run once for a predetermined number, N, of non-specific read requests (alternately, the test could be time based). If the number of non-specific read request is less than or equal to the predetermined number N, the step 630 is executed wherein a non-specific read is performed using the current Utility Volume. If, on the other hand, the number of non-specific read request is greater than the predetermined number N, then the procedure to select a Utility Volume is run at step 625. The moments when a session activates the selection procedure are called selection points, the selection points being randomly generated by a clock (not shown). A first determination made at step 625 is a determination as to whether the current Utility Volume is acceptable (no application activity, moderate non-specific DASD read activity), and if so, the current Utility Volume is retained (again perform step 630). If a new Utility Volume is required, then step 635 cyclically scans the devices (beginning where the previous scan ended).

The selection procedure scans a number of potential Utility Volumes, building a special Penalty Index (PI) for each. A Penalty Index includes two components: (1) a weighted sum of specific and non-specific activity on the device; and (2) a penalty for devices with high loads (a penalty defines an order of preference when testing candidates for a Utility Volume). The Penalty Index is calculated subtracting the sessions own non-specific read activity at the device, if any. The penalties for high loads are external parameters of the procedure and can be tuned according to needs.

Penalty Indexes are devised such that detecting devices without specific device I/O activity is simple (such devices are known as dormant devices). A preference is given to the dormant devices. At step 640, if a dormant device is encountered, then that device become the new Utility Volume and step 642 is performed. If a dormant device is not found, at step 645 no penalty is given dormant devices; a small penalty is given to devices with small non-specific I/O activity; a moderate penalty is given to devices with moderate non-specific I/O activity; and a high penalty is given to devices with a high combined device specific and device non-specific activity. Additionally, a proportional penalty is attributed to the application activity. At step 650 the device having the lowest Penalty Index is chosen as the new Utility Volume for the current session.

Details of the preferred embodiment of the present invention are now set out in greater detail. The description assumes a system having regular DASD I/O activity, typically varying with time and not known in advance, and having a number of independent processes, N_Sessions, each comprising non-specific DASD read activity. Each session of non-specific DASD read requests has a DASD as its current Utility Volume. Those DASD available for use as Utility Volumes, if necessary, can be restricted to certain devices. Such a restriction being based upon protection, performance or other administrative considerations. Hence, the set of potential Utility Volumes is assumed to be given. Furthermore, a device can be used by more than one session.

Referring again to step 620, periodically a session decides whether to retain the current Utility Volume or whether to select another DASD as a new Utility Volume. These decision points are hereinafter called Session Points, with such decisions preferably being made at the storage controller or control unit level with relevant information being maintained at such control unit. This described mechanism minimizes response time degradation for regular DASD I/O activities and for the non-specific DASD read activity.

A first part of the procedure involves management of the data structure, wherein the data structure reflects basic dynamics of regular and non-specific device activity. Data structure management is both clock and event driven. The data structure includes two field types: (1) Counters; (2) Indexes. The Counters (for example, as performed by microprocessor 70 in FIG. 3) count host processor I/O activity per unit time (including both specific and non-specific), and are updated for each I/O operation. The Indexes, also known as Activity Indexes, describe an average recent activity of the devices. The Counters and Indexes are periodically and asynchronously updated at predetermined times by each host processor. These predetermined times or moments are further referred to as Refreshment Points. Hence, the data structure reflects a dynamic load on the devices averaged over a relatively short time interval. The Indexes are then used in a second part of the procedure referred to as Utility Volume Selection.

The Utility Volume Selection may occur at points in time corresponding to either a clock or an event, with such points being hereinafter referred to as Selection Points. Utility Volume Selection is activated at randomized points to avoid correlations between selections of different sessions. Refreshment Points and Selection Points sequences are asynchronous and independent.

DATA STRUCTURES

Each data processing system 10 includes shared and local memory. The shared memory is accessible by each storage path 48, 50, 52 and 54 (c.f. shared controlled array 64, 66 in FIG. 2), and the local memory (c.f. memory 49, 51, 53 and 55 in FIG. 2) is accessible only by the corresponding storage path processor. Shared memory is further composed of more expensive fast shared memory and lower cost slow shared memory. Information exchange among sessions is accomplished via the data structure in the shared memory. The data structure comprising the Counters and Indexes is now described, wherein a number of processors at the storage controller is represented by "k".

Two arrays of local counters are maintained in each local memory of each processor (hence k copies of these arrays exist). A first local counter is referred to as count_spc (d) wherein there exists one field per device, the first local counter counting a number of specific I/Os at device (d) since a last Refreshment Point for the particular host processor. A second local counter, count_nsp (d), wherein there exists one each per device, counts a number of non-specific DASD read requests at device d since a last Refreshment point for the corresponding processor. Each processor manages its own counters for its own operations and the processors need not exchange information amongst themselves. Periodically, for example once every second—at the Refreshment Point, first and second counter values are used to calculate the indexes.

The Activity Indexes measure an average recent activity at the devices, one for each device. Activity Index values are proportional to a moving average (weighted average with exponential weights) of a number of I/Os per period between Refreshment Points. There are two different Activity Index arrays, including SPC (d) which is an index of device specific activity at device d, and NSP (d) which is an index of non-specific activity the device d. A total of k+1 sets of Activity Index arrays are maintained, including k sets which corresponds to one set for each local memory of each processor, and a single set in slow shared memory of the storage controller. The k local sets are provided so that the slow shared memory need not be accessed at the Selection Points, but only at the Refreshment Points. The processors recalculate its Activity Index at each Refreshment Point, updates the results to its local memory and copies the results to the slow shared memory.

An additional data field includes UV (s) that is associated with the logical device currently used by the Sth session as its Utility Volume. An auxiliary global parameter, Last, identifies the last device tested as a candidate for Utility Volume.

UPDATING AT A REFRESHMENT POINT

Each local memory unit maintains the variables SPC (d), NSP (d), count_spc (d), and count_nsp (d). At each Refreshment Point these counters are computed. The Refreshment Points occur asynchronously and independently at the k processors. At a Refreshment Point the values for SPC (d) and NSP (d) are read from the slow shared access memory, and these values are updated at the local memories according to the following equations:

$$SPC\ (d) = MAV(SPC\ (d),\ count\_spc\ (d)) \quad\quad EQ\ (1);$$

$$NSP\ (d) = MAV(NSP\ (d),\ count\_nsp\ (d)) \quad\quad EQ\ (2);$$

wherein MAV is an integer function moving average having a general form MAV(i, c), i being an index and c being a current value of a counter, and further wherein:

$$MAV(i, c) = i - \text{floor}(i/\text{depreciation}) + \min(c*\text{scale\_factor},\ count\_thresh) \quad\quad EQ\ (3).$$

The new values of SPC (d) and NSP (d) are copied back into the slow access shared memory. The counters count_spc (d) and count_nsp (d) are reset to zero.

MAV is essentially a modification of a moving average of the counters. The value of MAV is approximately proportional to a weighted average of the counters with exponential weights. If the mean value of a sequence cn equals c mean and if i (n+1)=MAV(in, cn), then taking the expected values if i and c at both sides of EQ (3) yields i approximately equal to depreciation * scale_factor * c mean+depreciation/2. The MAV has the important property that once MAV becomes positive, it remains positive forever. This property allows for distinguishing the volumes known as dormant volumes. If the index is zero, the device has never been used (by the respective activity) since an initialization of the Activity Index. At the beginning of a session the Activity Indexes are initialized to zero.

UTILITY DEVICE SELECTION MECHANISM

A random clock, at each host processor, is used at each Selection Point wherein the random clock is a random number generator producing a "one" or a "zero". A "one," with a probability p, is interpreted as "run the Selection Procedure" and a "zero," with a probability 1–p, is interpreted as "do not run the Selection Procedure". Using the random clock allows for selecting a Utility Volume not at every Selection Point, but at random occurrences for maintaining a reasonable trade-off between computational overhead and selection speed reaction for load variations. At a Selection Point where the random clock has produced a "zero," the current Utility Volume value is kept in the appropriate data field UV (s) in the local memory. If two or more sessions make selections approximately at the same time, similar data will be used and consequently the selections are likely to be identical. Randomizing the Selection Points for differing sessions avoids an undesirable correlation of the selections. Without randomization, sessions could make identical selections continuously.

The selection mechanism begins by inspecting the random clock. If the random clock is equal to "zero", then do nothing which defaults to using the current device as the Utility Volume for the session. If the random clock is equal to "one", then read the current Utility Volume for the current session and set curr_UV=UV (s). Next, a determination is made as to whether the current Utility Volume is good enough to keep. The current Utility Volume is kept if it is dormant (no application activity): SPC(curr_UV)=0. If the current Utility Volume is not dormant, then a determination is made whether the current activity is sufficiently low: NSP(curr_UV) is less than or equal to NSP_thresh, wherein NSP_thresh is an external parameter corresponding to a moderate non-specific DASD read activity. If non-specific activity is low enough, the session continues to use the current Utility Volume (that is change nothing)

If the current Utility Volume was not dormant and the application load or the non-specific DASD read activity is higher than a responsive threshold, then a new Utility Volume will be selected. To select a new Utility Volume, a certain number of devices will be tested (based upon an external parameter) starting from Last+1. If when testing the devices a dormant device is found, then that dormant device is chosen as the current Utility Volume. Mathematically this is represented as:

$$SPC\ (d) = 0;$$

and $$NSP\ (d) \text{ is less than or equal to NSP\_thresh.}$$

Further selection is suspended and UV (s) is updated accordingly. Otherwise, for each device d, the Penalty Index is calculated to reflect the load level of the device d. The Penalty Index, PI is then calculated. After calculating the Penalty Index for the devices in the device list, the device list is scanned and the device having the lowest PI is selected as the current Utility Volume. UV (s) is then updated to reflect the new Utility Volume. Finally, Last is updated as the last device checked.

The Penalty Index is a weighted load index of the devices, and is a function of:

$$PI(d, curr\_UV, SPC (d), NSP (d)) \qquad EQ (4);$$

wherein d is device number, curr_UV is the current Utility Volume for this session, and SPC (d) and NSP (d) are calculated as follows in EQ (5):

$$aver = \frac{\sum_i NSP(i)}{N_{sessions}}$$

Wherein N_sessions is the number of currently running sessions. Given an assumption that the amount of non-specific activity of the sessions are similar, this is an average impact of one session on the Activity Index (this assumption is introduced for simplicity). If this assumption is not valid, then additional session activity counters would be introduced, which additional counters would subtract the session's own load on the device.

A net non-specific DASD read activity for a volume is calculated. If d is the current Utility Volume for a session, then d has a rebate on its non-specific DASD read activity. Thus, net_NSP reflects the total non-specific DASD read activity of sessions other than session s. This is represented as:

```
If (d = curr_UV)
    then
        net_NSP = max(NSP (d) – aver, 0);
    else
        net_NSP = NSP (d).
```

Two additional thresholds are used, a maximum desirable level of non-specific DASD read activity at a device, NSP_threshold, and a maximum joint level of non-specific DASD read activity and regular I/O activity, Barrier. NSP_threshold and Barrier are used to distinguish loads of different types and assign corresponding penalties. The values of these thresholds and an array of penalty scores, Penalty(i), are external parameters of the procedure. Penalties are assigned as follows:

(1) if a device is dormant and has a moderate non-specific DASD read activity (a session can be added), then no penalty is assigned;

(2) if a device has an application load but has moderate non-specific DASD read activity, the device is penalized;

(3) if a device has high non-specific DASD read activity (adding a session degrades performance substantially), a high penalty is assigned; and (4) if a joint load of application and non-specific DASD read activity exceeds a predetermined level (the device is highly loaded), then a prohibitive penalty is assigned. This is expressed as:

```
if (net_NSP < NSP_thresh)
{
    if (SPC (d) == 0)
        Fine = 0;
    else
        Fine = Penalty(1);
}
else
    if (A*SPC + B*net_NSP < Barrier)
        Fine = Penalty(2)
    else
        Fine = Penalty(3),
``` wherein A and B are weighing coefficients.

The total index is a weighted sum of regular activity and non-specific DASD read activity at the device, including the penalty. The penalties make the less loaded devices more preferable for selection and provides a means for accounting for different priorities of performance degradation for specific and non-specific activities. The difference in priorities are expressed by the coefficient weight in the PI formula:

$$PI = \text{weight} * SPC\ (d) + \text{net\_NSP}(d) + \text{Fine} \qquad EQ\ (6).$$

The coefficient weight in PI can also be interpreted as a penalty for device specific activity.

The mechanism described herein for selecting a Utility Volume for non-specific DASD reads dynamically monitors both non-specific and regular specific I/O activity at the storage controller. Specific and non-specific activity is separated such that balancing these types of loads on the devices is accomplished, consequently improving the overall performance of the storage controller. The preferred embodiment of the present invention provides economical determinations in both processing overhead and in memory requirements for data structure maintenance. Since processing determinations occurs at the storage controller, the invention is usable in configurations having multiple host processors. Randomization at the selection procedure prevents contention of Utility Volume selections. Penalties are provided in order to direct selections as desired.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system having at least one host system, a storage controller attached to said host system, and a plurality of data storage devices connected to said storage controller, said host system maintaining a host unit control block for each said data storage device of said plurality of data storage devices and said storage controller maintaining a controller unit control block for each of said data storage devices, at least one data storage device being selected as a current Utility Volume, a method for selecting a new Utility Volume for servicing a session generating a non-specific read request for a data record from said host system comprising the steps of:

interrogating said session generating the non-specific read request at said host system for said data record, wherein said data record resides on a first data storage device of said plurality of data storage devices having a first host control block corresponding with said non-specific read request;

determining whether a selection must be made for selecting the new Utility Volume;

if a new Utility Volume selection is required, selecting the new Utility Volume from said plurality of data storage devices based upon weighted load conditions of said plurality of data storage devices, the new Utility Volume having a lowest weighted load condition and a second host unit control block being associated therewith, wherein said second host unit control block corresponds to a second data storage device of said plurality of data storage devices, said second data storage device different than said first device;

locking said second host unit control block; and transmitting said non-specific read request to said storage controller, said non-specific read request including said second host unit control block.

2. The method of selecting the new Utility Volume as recited in claim 1 wherein said step of determining whether a selection for the new Utility Volume must be made further comprises determining current load conditions of the current Utility Volume, including specific and non-specific loads, such selection being required when said current load conditions exceed a predetermined threshold.

3. The method of selecting the new Utility Volume as recited in claim 1 wherein the step of selecting the new Utility Volume comprises determining whether a dormant Utility Volume is available amongst said plurality of data storage devices and selecting said dormant Utility Volume as said new Utility Volume.

4. The method of selecting the new Utility Volume as recited in claim 3 wherein the step of selecting the new Utility Volume, if a dormant Utility Volume is not available, further comprises assigning a Penalty Index to each device of said plurality of devices.

5. The method of selecting the new Utility Volume as recited in claim 1 wherein said storage controller further includes a cache memory having a plurality of data items stored therein, said cache memory having a data lock for each such data item, said method further comprising the steps of:

locating a first controller unit control block that corresponds to said second host unit control block and to said second data storage device;

determining whether said second data storage device is in a non-busy state;

in response to a determination that said second data storage device is in a non-busy state, locking said first controller unit control block;

determining whether said data item containing said data record is located within said cache memory;

in response to a determination that said data item is in said cache memory, determining whether said data lock corresponding to said data item is unlocked;

in response to a determination that said data lock corresponding to said data item is unlocked, locking said data lock corresponding to said data item;

in the case where said first controller unit control block is in a non-busy state, said data item is in cache memory, and said data lock corresponding to said data item is unlocked, transferring said data record from said storage controller to said host system;

next, releasing said data lock corresponding to said data item; and releasing said first controller unit control block.

6. The method of selecting the new Utility Volume as recited in claim 1 wherein said storage controller further maintains a physical device lock corresponding to each data storage device, said method further comprising the steps of:

locating a first controller unit control block corresponding to said second host unit control block;

determining whether said second data storage device is in a non-busy state;

in response to a determination that said second data storage device is in a non-busy state, locking said first controller unit control block;

determining whether said physical device lock corresponding to said first data storage device containing said data record is unlocked;

in response to a determination that said physical device lock corresponding to said first data storage device containing said data record is unlocked, locking said physical device lock;

in the case where said first data storage device is in a non-busy state and said physical device lock corresponding to said first data storage device containing said data record is unlocked, transferring said data record from said first data storage device to said host system;

next, releasing said physical device lock corresponding to said first data storage device containing said data record; and releasing said first controller unit control block.

7. The method of claim 5 wherein said step of determining whether said first data storage device is in a non-busy state and the step of locking said first controller unit control block are accomplished as a single atomic operation.

8. The method of claim 6 wherein said step of determining whether said first data storage device is in a non-busy state and the step of locking said first controller unit control block are accomplished as a single atomic operation.

9. The method of claim 5 wherein said step of determining whether said data lock corresponding to said data item is unlocked and the step of locking said data lock corresponding to said data item are accomplished as a single atomic operation.

10. The method of claim 6 wherein said step of determining whether said physical device lock corresponding to said first data storage device containing said data record is unlocked and the step of locking said physical device lock are accomplished as a single atomic operation.

11. A method of selecting a best Utility Volume from a plurality of Utility Volumes for servicing a session generating a non-specific read request for a data record located on a first data storage device, generated at a host processor and transmitted to a storage controller, a current Utility Volume being presently selected for said session and wherein said method processes both specific and non-specific I/O requests, said storage controller connected to a plurality of Utility Volumes, each Utility Volume corresponding to a data storage device, said storage controller including a cache memory, said cache memory having a data lock corresponding to a data item contained within said cache memory, said storage controller further maintaining a physical device lock corresponding to each Utility Volume, said method comprising the steps of:

interrogating said session;

making an evaluation as to whether a Utility Volume selection should be performed;

determining whether the current Utility Volume should be maintained as the best Utility Volume if the making an evaluation step requires an evaluation;

keeping the current Utility Volume as the best Utility Volume if the current Utility Volume has a load lower than a predetermined threshold;

if the current Utility Volume has a load higher than the predetermined threshold, then evaluating said plurality of Utility Volumes for locating the best Utility Volume, and selecting the best Utility Volume for replacing the current Utility Volume;

locating a controller unit control block corresponding to said selected best Utility Volume, wherein said best Utility Volume further corresponds to a second data storage device;

determining whether said second data storage device in a non-busy state;

in response to a determination that said second data storage device is in a non-busy state, locking said controller unit control block corresponding to said second data storage device;

determining whether said data item containing said data record is located within said cache memory;

in response to a determination that said data item is in said cache memory, determining whether said data lock corresponding to said data item is unlocked and if so, transferring said data record from said cache to said host system;

in response to a determination that said data item is not in said cache memory determining whether said physical device lock corresponding to said first data storage device containing said data record is unlocked and if so, transferring said data record from said data storage device to said host system; and next, releasing said controller unit control block corresponding to said second data storage device, and releasing said physical device lock.

12. The method of selecting a best Utility Volume according to claim 11 wherein when said data lock corresponding to said data item is locked or when said physical device lock corresponding to said first data storage device containing said data record is locked, postponing the execution of said non-specific read request until such time as said data lock is unlocked or said physical device lock is unlocked.

13. The method of selecting a best Utility Volume according to claim 11 further including the step of executing a specific read request in parallel with said non-specific read request when said data record was located in said cache memory, said specific read request accessing said first data storage device, said specific read request retrieving a next data record stored on said first data storage device.

14. The method of selecting a best Utility Volume according to claim 11 further including the step of executing a specific read request in parallel with said non-specific read request accessing the same cache memory as that of said non-specific read request.

15. The method of selecting a best Utility Volume according to claim 14 wherein said making an evaluation step is performed at a predetermined Reference Point.

16. The method of selecting a best Utility Volume according to claim 15 wherein said determining whether the current Utility Volume should be maintained step is executed if a random clock is in a predetermined state at said predetermined Reference Point.

17. The method of selecting a best Utility Volume according to claim 11 wherein said keeping the current Utility Volume as the best Utility Volume is based upon whether the current Utility Volume is dormant or has a sufficiently low non-specific processing index.

18. The method of selecting a best Utility Volume according to claim 11 wherein said evaluating said plurality of Utility Volumes includes determining whether any of said plurality of Utility Volumes are dormant, and, if so, selecting a dormant Utility Volume as the best Utility Volume.

19. The method of selecting a best Utility Volume according to claim 18 wherein said evaluating said plurality of Utility Volumes further includes assigning a Penalty Index to each Utility Volume of said plurality of Utility Volumes, said Penalty Index being a weighted index based upon specific and non-specific processing and recency of said processing, wherein a Utility Volume of said plurality of Utility Volumes having a best Penalty Index is selected as the new Utility Volume.

20. A data processing system comprising:

at least one host computer, said at least one host computer having a local memory for storing a first counter data structure, said at least one host computer maintaining a plurality of host unit control blocks, wherein said at least one host computer counts a number of specific and a number of non-specific I/O requests for updating said first counter;

a storage subsystem including a plurality of direct access storage devices including a first direct access storage device storing a first data record thereon, and a storage controller, said storage controller being connected to each of the plurality of direct access storage devices through a plurality of storage paths and to said at least one host computer;

a shared memory array coupled to said storage controller for storing an index data structure;

a processor within said storage path for determining a Penalty Index for each direct access storage device coupled thereto of said plurality of direct access storage devices, and updating said index data structure at said shared memory and said local memory, said processor selecting a Utility Volume based upon said Penalty Index;

a physical device lock corresponding to each direct access storage device of said plurality of direct access storage devices maintained within said storage controller;

means for generating a non-specific read request at said at least one host computer for said first data record;

means for selecting one of said host unit control blocks corresponding to said Utility Volume, said Utility Volume further corresponding to a second direct access storage device;

means for locking said selected host unit control block corresponding to said second direct access storage device; and means for transmitting said non-specific read request to said storage controller.

21. The data processing system as set forth in claim 20, further comprising:

a cache memory within said storage controller, said cache memory having a data lock corresponding to a subset of data items contained within said cache memory;

means for locating a controller unit control block corresponding to one of said host unit control blocks corresponding to said second direct access storage device;

means for determining whether said second direct access storage device is in a non-busy state;

means responsive to a determination that said second direct access storage device is in a non-busy state, for locking said corresponding controller unit control block;

means for determining whether said data record is located within said cache memory;

means responsive to a determination that said data record is in cache memory, for determining whether said data lock corresponding to said data record is unlocked;

means responsive to a determination that said data lock corresponding to said data record is unlocked, for locking said data lock corresponding to said data record;

means responsive to determinations that said controller unit control block is in a non-busy state, said data record is in cache memory and said data lock corresponding to said data record is unlocked, for transferring said data record from said storage controller to said host computer;

means for releasing said data lock corresponding to said data record; and means for releasing said controller unit control block.

22. The data processing system as set forth in claim 20, further comprising:

means for locating a controller unit control block corresponding to said second direct access storage device;

means for determining whether said second direct access storage device is in a non-busy state;

means responsive to a determination that said second direct access storage device is in a non-busy state, for locking a corresponding physical device lock of said controller unit control block;

means for determining whether said physical device lock corresponding to said first direct access storage device containing said data record is unlocked;

means responsive to a determination that said physical device lock corresponding to said first direct access storage device containing said data record is unlocked, for locking said physical device lock corresponding to said first direct access storage device;

means responsive to determinations that said first direct access storage device is in a non-busy state and said physical device lock corresponding to said first device containing said data record is unlocked, for transferring said data record from said direct access storage device to said host computer;

means for releasing said physical device lock corresponding to said first device containing said data record; and means for releasing said controller unit control block.

* * * * *